(12) United States Patent
Nagayama et al.

(10) Patent No.: US 7,384,707 B2
(45) Date of Patent: Jun. 10, 2008

(54) NON-AQUEOUS ELECTROLYTE SECONDARY BATTERY HAVING ELECTRODE ACTIVE MATERIAL MEMBRANE LAYER

(75) Inventors: Mori Nagayama, Yokohama (JP); Kouichi Nemoto, Zushi (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 650 days.

(21) Appl. No.: 10/917,305

(22) Filed: Aug. 13, 2004

(65) Prior Publication Data

US 2005/0048371 A1    Mar. 3, 2005

(30) Foreign Application Priority Data

Sep. 2, 2003  (JP)  ............ P 2003-309744

(51) Int. Cl.
*H01M 4/64*  (2006.01)
*H01M 4/58*  (2006.01)

(52) U.S. Cl. ............... 429/233; 429/236; 429/245; 429/231.95; 429/304

(58) Field of Classification Search ......... 429/233, 429/236, 238, 239, 241, 242, 245, 231.1; 204/280, 204
See application file for complete search history.

(56) References Cited

U.S. PATENT DOCUMENTS 6,566,013 B2 * 5/2003 Nakamizo et al. .......... 429/303
2003/0138676 A1 * 7/2003 Leban ....................... 429/9
2006/0051640 A1 * 3/2006 Bruck et al. ................ 429/26
2007/0134532 A1 * 6/2007 Jacobson et al. ........... 429/32
2007/0262648 A1 * 11/2007 McKenzie .................. 307/64

FOREIGN PATENT DOCUMENTS

| JP | 7-220722 | | 8/1995 |
| JP | 08-007926 | * | 1/1996 |
| JP | 8-170126 | | 7/1996 |
| JP | 9-175825 | | 7/1997 |
| JP | 9-213307 | | 8/1997 |
| JP | 10-247497 | | 9/1998 |

* cited by examiner

*Primary Examiner*—Raymond Alejandro
(74) *Attorney, Agent, or Firm*—McDermott Will & Emery LLP

(57) ABSTRACT

A non-aqueous electrolyte secondary battery has an electrode and an electrolyte layer. The electrode includes a collector having a lot of fine pores on its surface, and a membrane layer made of an electrode active material provided along the surface shape of the fine pores of the collector. By this structure, the battery can manifest an excellent performance even in charging and discharging at high speed without using a binder and conductive material.

8 Claims, 5 Drawing Sheets

NON-AQUEOUS ELECTROLYTE SECONDARY BATTERY HAVING ELECTRODE ACTIVE MATERIAL MEMBRANE LAYER

BACKGROUND OF THE INVENTION

1. Field of the Invention

The present invention relates to a non-aqueous electrolyte secondary battery, more specifically, to a constitution of a positive electrode material in a non-aqueous electrolyte secondary battery.

2. Description of the Related Art

Recently, with a view to the worldwide issue of air pollution due to automotive exhaust gas, electric vehicles using electricity as a power source, hybrid vehicles driven by a combination of an engine and a motor, and fuel cell vehicles using a fuel cell as a power source, and the like are attracting attention. Developments of batteries of high energy density and high output density mounted on those vehicles are taking important positions industrially. Further, also regarding vehicles using only an engine as a power source, vehicles carrying a high voltage battery, which enable mounting of various electrically powered equipments, are put into practical use.

Due to its high energy density and discharge voltage, a lithium secondary battery is believed to be a battery suitable for such vehicles, and various developments thereof are progressed.

A lithium secondary battery is comprised of a positive electrode and a negative electrode capable of storing and releasing a lithium ion, and a non-aqueous electrolyte layer. The electrode contains an electrode active material, conductive material, electrolyte, electrolyte salt, binder and the like. The non-aqueous electrolyte layer is composed essentially of an electrolyte salt and a non-aqueous solvent.

When charging and discharging is conducted at high current rate in such a battery, a lithium ion present on an electrolyte inside of an electrode is absorbed rapidly in an electrode active material. By this, the lithium ion concentration in the electrode decreases, lithium ions are diffused and supplied from a non-aqueous electrolyte layer. Lithium ions enter into and exit from a non-aqueous electrolyte layer, and simultaneously electrons from a collector move through a conductive material to cause progress of an electrode reaction, thus performing charging and discharging.

Such an electrode for the lithium secondary battery is produced by mixing an electrode active material, conductive material and binder in a solvent to give a slurry, then, coating the slurry on a collector and drying this (see, Japanese Patent Application Laid-Open No. H7-220722).

An electrode produced by the method of Japanese Patent Application Laid-open No. H7-220722 has a constitution in which an electrode active material and the like are supported by a binder and electrical contact between electrode active materials is maintained by a conductive material.

SUMMARY OF THE INVENTION

However, a binder and a conductive material inhibit diffusion of a lithium ion and have a problem of raising the diffusion resistance of a lithium ion.

Further, a thinner electrode active material layer is more desirable since charging and discharging at higher speed is possible. However, the thickness of an electrode active material layer formed by such a method of coating a slurry is at least about tens of micrometers and decrease in thickness is difficult. Thicker thickness delays reaching of electrons and lithium ions into an electrode. Therefore, a battery specialized to charging and discharging at high speed is difficult.

Japanese Patent Applications Laid-open Nos. H8-170126 and H9-213307 disclose a method of using a foamed metal or porous metal having large surface area, and the like as a collector. Such a method can increase the reaction area of an electrode and gives a trial of improvement in electrode capacitance.

However, in these methods, an electrode is produced by coating a slurry on a porous collector. Therefore, a slurry clogs pores, and consequently, it is impossible to uniformly coat a slurry into pores. That is, it is impossible to produce an electrode of approximately uniform thickness on a porous collector. This means limitation in improvement in electrode capacitance. Further, since an electrode active material is not fixed completely on a collector, it is impossible to significantly decrease a conductive material and a binder, and movement of lithium ions remains disturbed. Accordingly, it is difficult to obtain a battery manifesting an excellent ability in charging and discharging at high speed even by these methods.

The present invention was made in consideration of the above-described problems. It is an object of the present invention to provide a non-aqueous electrolyte secondary battery capable of manifesting an excellent ability in charging and discharging at high speed.

According to one aspect of the present invention, there is provided a non-aqueous electrolyte secondary battery comprising: an electrode including: a collector having a lot of fine pores on its surface; and a membrane layer made of an electrode active material, the membrane layer being provided along a surface shape of the fine pores of the collector.

BRIEF DESCRIPTION OF THE DRAWINGS

The invention will now be described with reference to the accompanying drawings wherein.

DETAILED DESCRIPTION OF THE PREFERRED EMBODIMENT

Hereinafter, description will be made of embodiments of the present invention with reference to the drawings.

The present invention according to a first aspect provides a non-aqueous electrolyte secondary battery comprising an electrode which includes an electrode active material membrane layer provided along a surface shape of fine pores of a porous collector.

The basic constitution of the non-aqueous electrolyte secondary battery of the present invention is as described below. Namely, as the positive electrode and negative electrode, an electrode active material membrane layer capable of storing and releasing lithium ions is provided on a collector, further, a power generating element formed by lamination of a positive electrode and negative electrode via an electrolyte layer is accommodated in a battery case.

Figure 1:
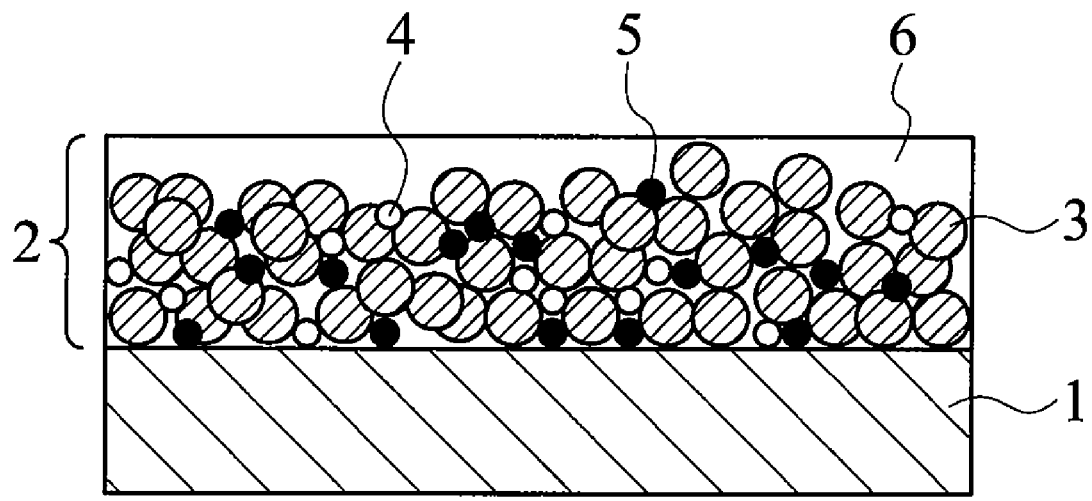
FIG. 1 is a cross-sectional view of a conventional electrode for a non-aqueous electrolyte secondary battery.

Here, a conventional electrode for the non-aqueous electrolyte secondary battery is shown in FIG. 1. In the conventional electrode, solid materials such as an electrode active material 3, binder 4 and conductive material 5 and the like are provided on a collector 1 such as a smooth aluminum foil and the like, and an electrode active material layer 2 containing an electrolyte 6 between the solid materials is formed. When an electrode reaction progresses in such an electrode, electrons are transmitted to the electrode active material 3 via the collector 1 and the conductive material 5, and lithium ions are diffused into the electrolyte 6 and stored into and released from the electrode active material 3.

In the electrode, however, the electron conductivity of a conductive material such as carbon and the like is very low as compared with a collector such as aluminum and the like, further, contact area between a collector and an electrode active material is small, therefore, contact resistance is also a problem Against such a problem, Japanese Patent Applications Laid-open Nos. H8-170126 and H9-213307 suggest a method of coating a solid material such as an electrode active material and the like on a porous collector such as foamed metal or fiber metal sintered body and the like, to increase contact area between the collector and the electrode active material. However, when a coating method is used, it is impossible to uniformly coat the solid material into pores of the porous collector, and a solid material causes disturbance, resultantly, it is difficult to secure a route sufficient for diffusion of lithium ions.

Figure 2:
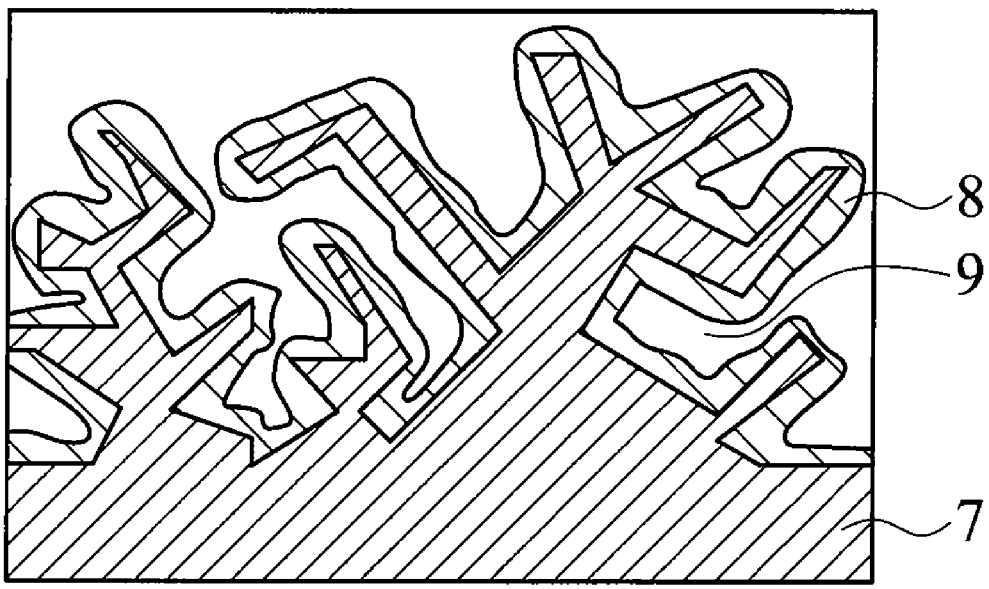
FIG. 2 is a cross-sectional view of an electrode for a non-aqueous electrolyte secondary battery of the present invention.

In the electrode of the present invention, an electrode active material membrane layer 8 (hereinafter, also referred to simply as "membrane layer") is formed even into fine pores 9 of a porous collector 7, as shown in FIG. 2. By this, a lithium ion diffusion route can be sufficiently secured, and an electrode of high output can be obtained.

In general, an electrode active material layer in a non-aqueous electrolyte secondary battery has a thickness of several to tens of micrometers. However, in the electrode of the present invention, an electrode active material membrane layer has a thickness of as extremely small as 1.0 μm or less. By this, a distance of diffusion of electrons and lithium ions in an electrode active material membrane layer can be significantly shortened, to decrease ohmic and diffusion resistance. Therefore, an electrode can be produced by decreasing the amount of a conductive material such as carbon and the like conventionally used or without using the conductive material.

The electrode active material membrane layer 8 has a structure constituted of an electrode active material itself, in which an electrode active material is dispersed approximately uniformly in molecular level. Therefore, an electrode can be formed without using or decreasing the amount of a binder such as polyvinylidene fluoride, polyethylene tetrafluoride and the like conventionally used for mutually binding electrode active materials.

As described above, the electrode in the present invention can reduce the use amount of a conductive material and binder. A conductive material and binder are not correlated directly with an electrode reaction and disturb diffusion of lithium ions, therefore, such reduction in the use amount can decrease the diffusion resistance of lithium ions, leading to lowering of the resistance of the whole battery. Further, since an electrode active material membrane layer is formed with extremely small thickness, the diffusion distance of electrons in the membrane layer can be shortened significantly, and by this, the electron conductivity can be significantly increased. Therefore, the electrode of the present invention can be an electrode of high output.

Such an electrode may be used as both a positive electrode and a negative electrode, or as either one of them, in the non-aqueous electrolyte secondary battery of the present invention.

Hereinafter, a positive electrode is exemplified and illustrated further in detail.

The porous collector has a pore size of 0.1 to 10 μm, preferably 0.2 to 5 μm, and a porosity of 10 to 90% by volume, preferably 10 to 40% by volume. By this, it has a surface area of 10 to 500-fold of that of a collector conventionally used. Therefore, a contact area between a collector and an electrode active material can be sufficiently increased.

In the porous collector, oxidation-resistance against high potential is required at a positive electrode, therefore, it is preferable to use a valve metal forming an oxidized membrane on the surface thereof. As the porous collector, single bodies or alloys of valve metals such as aluminum, tantalum, niobium, titanium, hafnium, zirconium, zinc, tungsten, bismuth and antimony, or stainless alloy and the like are specifically listed. The alloy may be an alloy obtained by using two or more of those exemplified as the valve metal, or an alloy obtained by using one of those exemplified as the valve metal, and another metal.

It is desirable that the thickness of an electrode active material membrane layer at a positive electrode (hereinafter, also referred to simply as "positive electrode layer") is smaller since charging and discharging at high speed is possible, and when the thickness is too small, electrode capacitance is not obtained. However, since the porous collector of the present invention has large surface area, the thickness of an electrode active material membrane layer can be decreased extremely.

The thickness of a positive electrode layer is desirably at least half of pore size of the collector, specifically 1.0 μm or less, preferably from 0.1 to 0.5 μm. When the thickness of a positive electrode layer is over half of pore size, there is a possibility of clogging of pores of a porous collector.

In a positive electrode layer, a positive electrode active material and an electrolyte salt for enhancing ion conductivity are contained, and in addition to them, a conductive material for enhancing electron conductivity, binder and electrolyte and the like can be contained.

The positive electrode active material is not particularly restricted, and preferably composed of a composite oxide or salt containing lithium and at least one element selected from the group consisting of cobalt, nickel, manganese, titanium, vanadium and iron. By this, a positive electrode active material is not dissolved in an electrolyte, and a battery of large capacity can be obtained.

Li—Co composite oxides such as $LiCoO_2$, Li—Ni composite oxides such as $LiNiO_2$, Li—Mn composite oxides such as $LiMn_2O_4$, Li—Fe composite oxides such as $LiFeO_2$, sulfate compounds and phosphate compounds of lithium and transition metal such as $LiFePO_4$; transition metal oxides and sulfides such as $V_2O_5$, $MnO_2$, $TiS_2$, $MoS_2$, $MoO_3$; $PbO_2$, AgO, NiOOH are specifically listed as the positive electrode active material.

The electrolyte salt is not particularly restricted, and $Li(C_2F_5SO_2)_2N$ (BETI: lithium bisperfluoroethanesulfonimide), $LiBF_4$, $LiPF_6$, $LiN(SO_2CF_3)_2$, $LiN(SO_2C_2F_5)_2$, LiBOB (Lithium bis(oxalato)borate) or mixtures thereof, and the like, are listed.

As the conductive material, acetylene black, carbon black, graphite and the like are mentioned. As the binder, polyvinylidene fluoride (PVDF), styrene-butadiene-rubber (SBR), polyimide and the like can be used. However, it is needless to say that the conductive material and binder are not limited to them.

In the present invention, a non-aqueous electrolyte is used in an electrolyte layer, therefore, it is preferable that a non-aqueous electrolyte is contained also in a positive electrode active material membrane layer. The reason for this is that by filling a non-aqueous electrolyte in a void between positive electrode active materials in a positive electrode layer, ion transmission in a positive electrode layer becomes smooth, and output of the whole battery increases.

As the non-aqueous electrolyte, an all solid electrolyte constituted solely of a polymer for electrolyte and a supporting salt such as an electrolyte salt and the like, and a polymer gel electrolyte prepared by allowing a polymer for electrolyte to support electrolysis solution, are mentioned.

On the other hand, when a polymer gel electrolyte and electrolysis solution are supported in a separator and used in an electrolyte layer, a positive electrode layer may contain no electrolyte.

The polymer for the all solid electrolyte is not particularly restricted, and polymers for electrolyte such as polyethylene oxide (PEO), polypropylene oxide (PPO), copolymers thereof, and the like are listed. Such polyalkylene oxide-based polymers sufficiently dissolve electrolyte salts such as BETI, $LiBF_4$, LiPFe, $LiN(SO_2CF_3)_2$, $LiN(SO_2C_2F_5)_2$ and the like. By forming a cross-linked structure, an excellent mechanical strength is manifested. When a sold polymer electrolyte is used in the present invention, it is contained at least in one of a positive electrode active material layer and a negative electrode active material layer. For further improving the battery property, it is suitable that a solid polymer electrolyte is contained in both of them.

The polymer gel electrolyte includes one containing electrolysis solution in an all solid electrolyte polymer having ion conductivity, and also include one obtained by supporting the analogous electrolysis solution in a skeleton of an electrolyte polymer (host polymer) having no lithium ion conductivity.

Here, as the electrolyte salt and plasticizer constituting electrolysis solution contained in a polymer gel electrolyte, the following compounds are listed. As the electrolyte salt, anion salt of inorganic acid such as LiBOB, LiPFe, $LiBF_4$, $LiClO_4$, $LiAsF_5$, $LiTaF_6$, $LiAlCl_4$, $Li_2B_{10}Cl_{10}$ and the like, and anion salt of organic acid such as $LiCF_3SO_3$, $Li(CF_3SO_2)_2N$, $Li(C_2F_5SO_2)_2N$ and the like, can be used. As the plasticizer, cyclic carbonates such as propylene carbonate (PC), ethylene carbonate (EC) and the like; chain carbonates such as dimethyl carbonate, methyl ethyl carbonate, diethyl carbonate and the like; ethers such as tetrahydrofuran, 2-methyltetrahydrofuran, 1,4-dioxane, 1,2-dimethoxyethane, 1,2-dibutoxyethane and the like; lactones such as γ-butyrolactone and the like; nitrites such as acetnitrile and the like; esters such as methyl propionate and the like; amides such as dimethylformamide and the like; and organic solvents such as aprotic organic solvents obtained by mixing at least one or more selected from methyl acetate and methyl formate, can be used. However, these are not all examples.

As the electrolyte polymer having no lithium ion conductivity used in a polymer gel electrolyte, monomers forming a gelled polymer such as polyvinylidene fluoride (PVDF), polyvinyl chloride (PVC), polyacrylonitrile (PAN), polymethyl methacrylate (PMMA) and the like can be used. However, these are not all examples. PAN, PMMA and the like can be used as the electrolyte polymer having ion conductivity since they have some ion conductivity, and these are exemplified as the electrolyte polymer having no lithium ion conductivity used in a polymer gel electrolyte.

The mass ratio of an electrolyte polymer (host polymer) to electrolysis solution in a polymer gel electrolyte may be determined depending on used object and the like, and is within the range from 2:98 to 90:10. Namely, bleeding of an electrolyte from peripheral portions of a positive electrode layer can be effectively sealed by providing an insulation layer and insulation treatment portion, and therefore, also the mass ratio of a host polymer to electrolysis solution in the polymer gel electrolyte can be determined relatively primarily in view of battery property.

In a positive electrode layer, the compounding amounts of components such as positive electrode active materials, conductive materials, binders, non-aqueous electrolytes (host polymer, electrolysis solution and the like), electrolyte salts and the like should be determined in view of battery use object (output-valuing, energy-valuing and the like) and lithium ion conductivity. For example, when the compounding amount of a non-aqueous electrolyte in a positive electrode layer is too small, lithium ion conductive resistance and lithium ion diffusion resistance in a positive electrode layer increase, causing a possibility of decrease in battery ability. On the other hand, when the compounding amount of a non-aqueous electrolyte in a positive electrode layer is too large, there is a possibility of decrease in the energy density of a battery. Therefore, the amount of a non-aqueous electrolyte corresponding to its object is determined in view of these factors.

Regarding an electrode in the non-aqueous electrolyte secondary battery of the present invention, an electrode of high output can be obtained by reducing the amount, as compared with conventional amount, of a conductive material and binder conventionally used as an electrode material, or even without using them.

The electrolyte layer in the non-aqueous electrolyte secondary battery of the present invention will be illustrated in detail.

From the standpoint of practical use, it is preferable to use a non-aqueous electrolyte layer made of a polymer for all solid electrolyte or a polymer gel electrolyte, as the electrolyte layer in the non-aqueous electrolyte secondary battery of the present invention. The electrolyte slurry for forming such an electrolyte layer contains an electrolyte polymer and electrolyte salt, and additionally, can contain a polymerization initiator and solvent and the like. The method of preparing them may be determined appropriately so as to obtain a desired non-aqueous electrolyte layer.

The method of forming an all solid electrolyte polymer includes a method of polymerizing monomers from a mixture of an electrolyte polymer and electrolyte salt, to form an all solid electrolyte polymer composed of an electrolyte polymer and electrolyte salt. A constitution in which a gel electrolyte or all solid electrolyte polymer is supported in a separator as described above is also possible. The electrolyte polymer and electrolyte salt and solvent are as described above, therefore, descriptions thereof will be abbreviated. The polymerization initiator has to be selected appropriately depending on a polymerization method (heat polymerization, photo-polymerization, radiation polymerization, electron beam polymerization and the like), and compounds to be polymerized. As the photo-polymerization initiator, benzyl dimethyl ketal and the like are mentioned, and as the heat polymerization initiator, azobisisobutyronitrile and the like are mentioned, but these are not all examples.

The polymer gel electrolyte is formed by polymerizing monomers using electrolysis solution containing an electrolyte polymer forming a gelled polymer, and the means for formation is not limited. The electrolyte polymer, electrolysis solution and ratio of them in this procedure are as described above, therefore, descriptions thereof will be abbreviated.

However, in the present invention, the amount of electrolysis solution contained in a polymer gel electrolyte may be made approximately uniform in a gel electrolyte, or may be decreased in gradient from the center part toward peripheral parts. The former is preferable since reactivity can be obtained in a wider range and the latter is preferable since a sealing property of an all solid electrolyte polymer part at the peripheral parts against electrolysis solution can be enhanced.

Smaller thickness of an electrolyte layer is more preferable for decreasing internal resistance. The thickness of an electrolyte layer may be within a range from 1 to 100 μm, preferably within a range from 5 to 50 μm. Here, the thickness of an electrolyte layer indicates the thickness of an electrolyte filled between a positive electrode and a negative electrode when a positive electrode and a negative electrode are each regarded as a sheet, and even if a positive electrode and negative electrode each have fine pores, electrolytes in fine pores are not included in thickness.

The separator in the non-aqueous electrolyte secondary battery of the present invention will be illustrated in detail.

The separator is not particularly restricted, and may be one having sufficient strength even if it is thin. As the separator, polyolefin-based separators such as polyethylene fine porous membranes, polypropylene fine porous membranes and the like having a thickness of about 10 to 20 μm, and the like are listed.

The negative electrode in the non-aqueous electrolyte secondary battery of the present invention will be illustrated in detail.

The negative electrode in the non-aqueous electrolyte secondary battery of the present invention may be one having the structure shown in FIG. 2, or one having a conventional structure obtained by coating an electrode active material layer uniformly on a collector as shown in FIG. 1.

The collector used in a negative electrode is required to form no alloy with lithium, in potential of movement of an active material. As the collector, conductive metals such as copper, nickel, titanium, stainless steel (SUS) and the like can be specifically used, and copper, SUS and nickel and the like are particularly preferable.

The electrode active material layer in a negative electrode (hereinafter, also referred to simply as "negative electrode layer") contains a negative electrode active material, and additionally, can contain a conductive material for enhancing electron conductivity, binder, electrolyte salt for enhancing ion conductivity, electrolyte and the like.

Items other than the kind of a negative electrode active material are basically the same as described in the column of "positive electrode layer", therefore, descriptions thereof will be abbreviated here.

As the negative electrode active material, various natural graphites and artificial graphites, for example, graphites such as fibrous graphite, flake-shaped graphite, spherical graphite and the like, and various lithium alloys and the like are listed. Specifically, carbon, graphite, metal oxide, lithium-transition metal composite oxide and the like can be used, and carbon or lithium-transition metal composite oxides are preferable. These carbon or lithium-transition metal composite oxides are materials excellent in reactivity and cycle durability, and taking low cost. By use of these materials in an electrode, a battery excellent in output property can be formed. As the lithium-transition metal composite oxide, lithium-titanium composite oxides such as $Li_4Ti_5O_{12}$ and the like can be used. As the carbon, graphite, hard carbon, soft carbon and the like can be used.

The thickness of a negative electrode layer is not particularly restricted and may be appropriately regulated so as to obtain a desired negative electrode.

The battery case in the non-aqueous electrolyte secondary battery of the present invention will be illustrated in detail.

The battery case accommodating a positive electrode and a negative electrode via an electrolyte layer is used for preventing deterioration under environment, and impact from outside in use of a battery. As the battery case, a battery case made of a laminate material obtained by laminating a polymer film and a metal foil in multiple can be used. For obtaining a battery of the present invention, a power generating element composed of a positive electrode, negative electrode and electrolyte layer provided on a collector is accommodated in the battery case, and peripheral parts thereof are connected by heat-welding, or its aperture parts formed into bag are heat-welded for seal. In this procedure, it is necessary to draw a positive electrode lead terminal and a negative electrode lead terminal out of the heat-welded part of a battery case. Portions from which lead terminals of positive and negative electrodes are drawn out are not limited to one portion.

The material constituting the battery case is not limited to the materials, and plastics, metals, rubbers and the like, or combination materials thereof are possible, and those in the form of film, plate, box and the like can be used. A method in which a tab communicating between inside and outside of a case is provided, and a collector is connected inside of the tab, can also be applied.

The non-aqueous electrolyte secondary battery has been illustrated referring to a lithium secondary battery for convenience of explanation, however, additionally, gel electrolyte batteries such as a sodium ion secondary battery, potassium ion secondary battery, magnesium ion secondary battery, calcium ion secondary battery and the like are mentioned. However, a lithium ion secondary battery is preferable from the standpoint of practical use.

A second aspect of the present invention is a bipolar type battery. The electrode for the non-aqueous electrolyte secondary battery of the present invention can be used in non-aqueous electrolyte batteries of various structures. Namely, when classified by form and structure, it can be applied to any forms and structures such as laminate type (flat) batteries, wound type (cylindrical) batteries and the like. From the standpoint of electrical connection form in a non-aqueous electrolyte secondary battery, it can be applied to any of batteries of non-bipolar type, namely, internal parallel connection type batteries, and batteries of bipolar type, namely, internal serial connection type batteries.

Figure 3A:
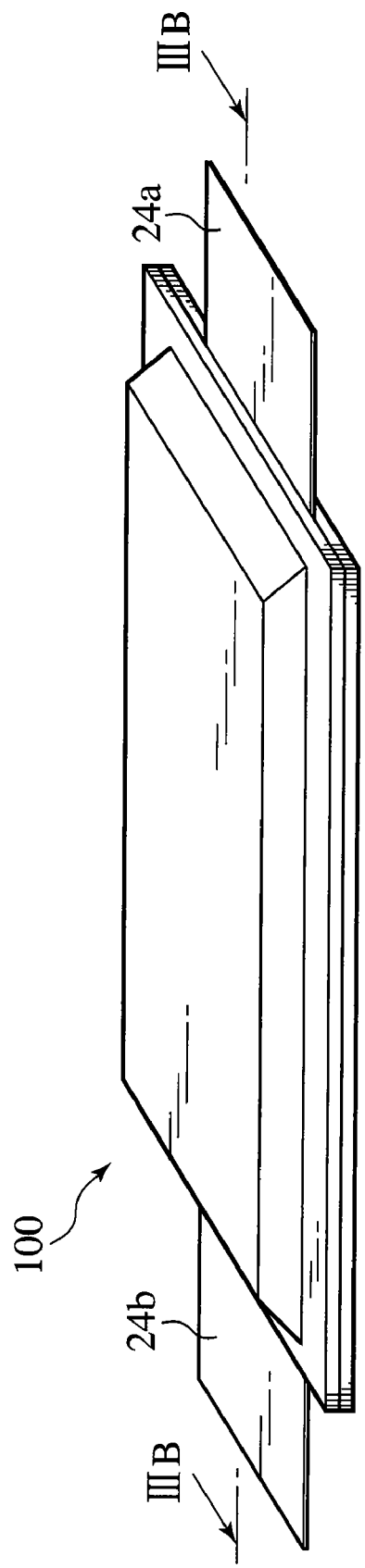
FIG. 3A is a perspective view of a bipolar battery using the electrode for the non-aqueous electrolyte secondary battery of the present invention.
Figure 3B:
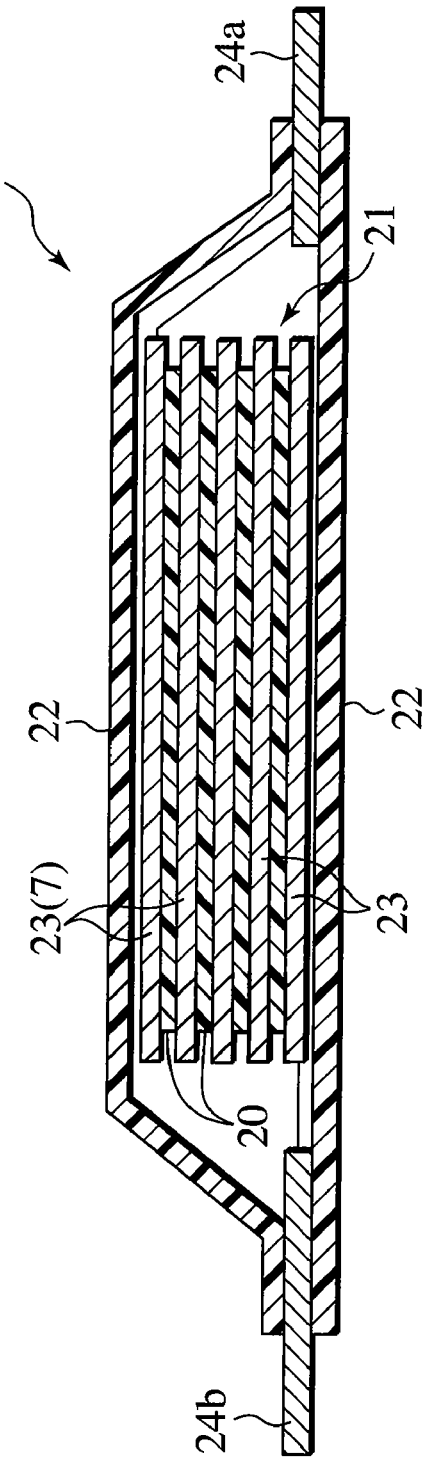
FIG. 3B is a cross-sectional view taken on line IIIB-IIIB of FIG. 3A.

The non-aqueous electrolyte secondary battery of the present invention is preferably a bipolar type battery 100 shown in FIGS. 3A and 3B. The bipolar battery 100 is constituted of a power generating element 21 comprising a bipolar electrode 23 composed of a porous collector 7, which has the positive electrode active material membrane layer and the negative electrode active material membrane layer as shown in FIG. 2, and an electrolyte layer 20. In the power generating element 21, a plurality of bipolar electrodes 23 are laminated in series via electrolyte layers 20. In the bipolar battery 100, a positive electrode tab 24a connected to the positive electrode side of the power generating element and a negative electrode tab 24b connected to the negative electrode side are drawn out of the battery case 22.

A bipolar battery can constitute a battery having high voltage of a single battery as compared with usual batteries, and excellent in capacity and output property. In the case of usual batteries, the number of lamination can be increased and the length of winding can be increased for improvement in output. However, in the case of bipolar type, it is difficult to take a winding structure, and voltage increases when the lamination number is simply increased even in the case of lamination structure, exceeding required voltage in some cases. Therefore, only means for improvement in output without increasing lamination number is to spread a projected area of the collector. However, increase in the projected area is not preferable since it is increase in set area of batteries. According to the present invention, the surface area of a porous collector can be extremely Increased even if the projected area does not change, consequently, output of a bipolar battery can be increased.

When the battery of the present invention is used as a bipolar type battery, it is preferable that pores of a porous collector are not penetrating.

A third aspect of the present invention is a battery module comprised of a plurality of the non-aqueous electrolyte secondary batteries and/or bipolar batteries of the present invention.

Figure 4C:
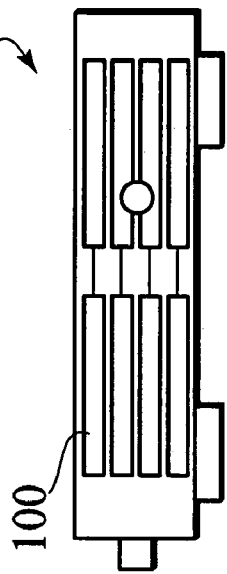
FIG. 4C is a side view of a battery module having non-aqueous electrolyte secondary batteries of the present invention provided therein.
Figure 4A:
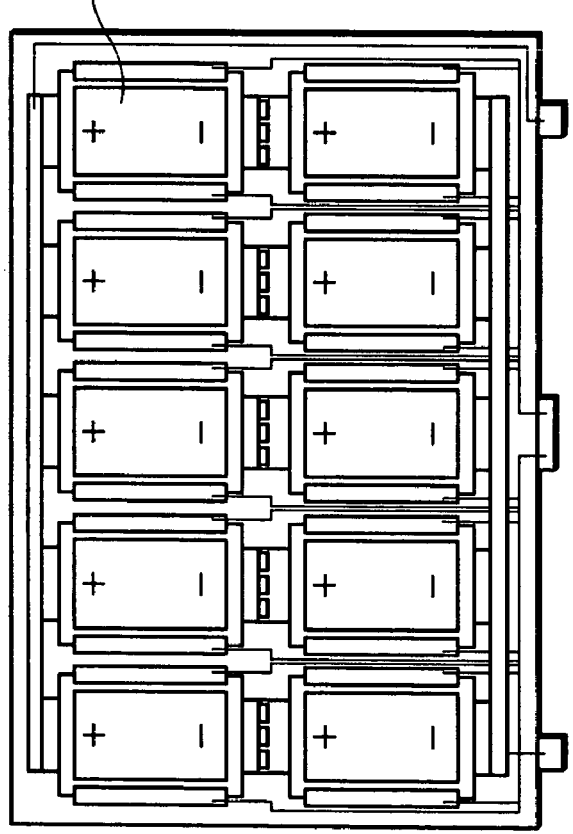
FIG. 4A is a plan view of a battery module having non-aqueous electrolyte secondary batteries of the present invention provided therein.
Figure 4B:
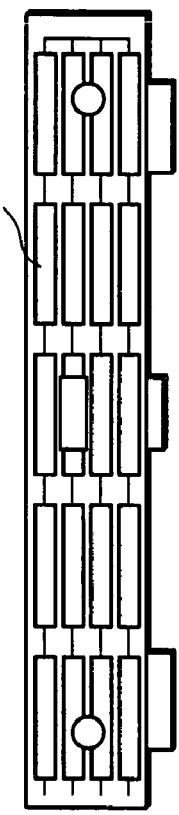
FIG. 4B is a front view of a battery module having non-aqueous electrolyte secondary batteries of the present invention provided therein.

In the battery module of the present invention, bipolar batteries 100 are combined in series or in parallel as shown in FIGS. 4A to 4C. The battery module 200 of the present invention may have a combination of a voltage detector, control circuit and display.

A battery module is a battery of large capacity in which optimum number of bipolar batteries of the present invention are connected in series to form battery groups, for obtaining voltage suitable as a driving power source of an electric vehicle, and optimum number of the battery groups are connected in parallel, for obtaining electric capacity required for this driving power source. Because of use with repetition of charging and discharging, the voltage of each battery constituting a battery module is constantly monitored, thus, a deteriorated battery can be grasped. Namely, the battery module of the present invention comprises a voltage detector for detecting the voltage of each battery, a control circuit for by-passing a full charged battery based on the detected voltage and electrically removing a battery showing deterioration in charging and discharging from the battery module, and a display for displaying the charged condition and discharged condition of each battery and displaying a battery showing deterioration.

Figure 5:
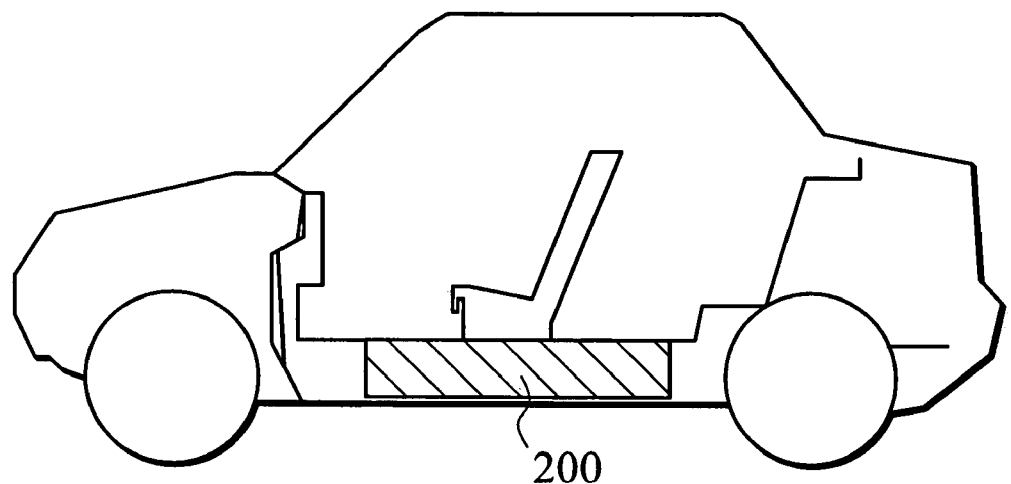
FIG. 5 is a side schematic view of a vehicle having a non-aqueous electrolyte secondary battery of the present invention mounted therein.

The non-aqueous electrolyte secondary battery of the present invention has various properties as described above. Therefore, from the standpoint of energy density and output density, it is suitable as a driving power source for vehicles for which particularly strict conditions are required, for example, electric vehicles, fuel battery vehicles and hybrid electric vehicles, and by this, vehicles excellent in fuel consumption and driving ability can be provided. Further, it is convenient to mount a battery module 200 as a driving power source under a seat at the center part of a body of an electric vehicle or hybrid electric vehicle, as shown in FIG. 5, since the space in a car and in a trunk can be enlarged. However, the present invention is not limited to these embodiments, and a battery can be set under the floor of a vehicle, in a trunk room, engine room, on a roof, under a bonnet (hood) and the like. In the present invention, not only a battery module but also a bipolar battery itself may be mounted depending on use application, alternatively, a battery module and a bipolar battery may be mounted in combination. As the vehicle on which the bipolar battery and/or battery module of the present invention can be mounted as a driving power source, the electric vehicles, fuel battery vehicles, hybrid electric vehicles and the like can be listed, but it is not limited to these.

A fourth aspect of the present invention is a method of producing a non-aqueous electrolyte secondary battery as described above.

The method of producing a non-aqueous electrolyte secondary battery of the present invention is characterized in that an electrode active material membrane layer is produced by a membrane formation technology such as a sol-gel method and the like, on a porous collector having pores formed by etching.

As the method of forming the porous collector 7 as shown in FIG. 2, a method of etching in electrolytic solution is mentioned. By such a method, the formed porous collector can obtain extremely large surface area as compared with the projected area of the surface of a flat collector of the same size. The surface area corresponding to this cannot be obtained by boring or sand blast, and the like.

The method of etching is a method of immersing a collector material in electrolytic solution for etching such as a hydrochloric acid solution and the like in an electrolyzer. In the electrolyzer, electrodes for applying alternating current are provided, and alternating current is applied between these electrodes to provide pores.

A positive electrode will be exemplified and illustrated below.

As the porous collector material, the valve metals may be used. The thickness of a porous collector material is within a range from 5 to 200 µm, preferably 10 to 150 µm. When the thickness of a porous collector material is less than 5 µm, there is a fear of generation of cutting and cracks without enduring stress in applying an electrode active material membrane layer on the surface. When over 200 µm, there is a fear that a foil becomes fragile and handling thereof becomes difficult, and production cost increases, being undesirable from the standpoint of decrease in the thickness of a battery membrane.

As the electrolytic solution for etching, various compositions can be used, and those dominantly containing chlorine ions are preferable, and specifically, those containing hydrochloric acid in an amount of 1 to 10% by weight are preferable. The temperature of electrolytic solution for etching is preferably from 15 to 80° C. The voltage applied may advantageously be alternating current, and it is conducted at a current density of 50 to 5000 A/m$^2$, preferably of 100 to 3000 A/m$^2$ for 1 to 60 minutes, preferably 3 to 30 minutes. When the current density is less than 50 A/m$^2$, etching takes a longer period of time, and there is a fear of formation of no porous structure, and even if over 5000 A/m$^2$, there is a possibility of difficulty in formation of etching pores, therefore, the range is preferable.

However, it is not limited to such an etching method, and may be appropriately regulated so as to obtain desired pores on the surface of a collector.

Next, on a collector having pores formed by etching, an electrode active material membrane layer is formed by a sol-gel method.

The sol-gel method is a method in which a sol solution composed of a metal alkoxide is subjected to hydrolysis and condensation reaction to give a gel which has lost flowability, and this gel is baked to form a membrane. The sol-gel method can mix raw materials uniformly at molecular level, since it is a method of forming a membrane from a liquid phase. Therefore, a membrane can be formed even in pores without clogging pores of a porous collector.

In the present invention, the sol solution is adhered on a porous collector, subsequently, gelled and heated, to form a membrane on the surface of a porous collector. However, the method is not limited to this.

The sol solution is obtained by adding a metal salt preferably used as a positive electrode active material to a water-alcohol solution and the like.

Nitrates, nitrites, carbonates, acetates, sulfates, oxynitrates, halides, metal complex salts of cobalt, nickel, manganese, titanium, vanadium, iron, lithium, and the like are listed as the metal salt.

The metal salt added to a sol solution is preferably added so that the weight of a metal component is 0.1 to 20% by weight, particularly, 0.5 to 10% by weight based on water.

Methanol, ethanol, 2-propanol, butanol and the like are listed as the alcohol solution. The ratio of alcohol to water is preferably about 0.5 to 5-fold (molar ratio).

To the sol solution, polyvinyl alcohol, ethanolamine and the like may be added as a stabilizer. It is preferable to add the stabilizer so that the molar number thereof is 0.5 to 3-fold of the molar number of all metal ions contained in a solution.

The viscosity of the sol solution is preferably 1000 cp or less, particularly, 100 cp or less. When the viscosity of a sol solution is over 1000 cp, there is a possibility of difficulty in forming a uniform film.

For adhering the sol solution on a porous collector, for example, a porous collector may be immersed in the sol solution, or a spin coating method and the like may also be used.

For gelling a sol solution adhered on a porous collector, there is, for example, a method of effecting hydrolysis and condensation reaction in the presence of a basic catalyst or acidic catalyst. As the basic catalyst, an ammonium solution, amines such as ethylamine, diethylamine, triethylamine and the like are listed, and it is general to use those having a pH of about 9 to 14. As the acidic catalyst, hydrochloric acid, nitric acid, sulfuric acid, phosphoric acid and the like are listed, and it is general to use those having a pH of about 1 to 5. From the standpoint of reaction speed, it is preferable to use a basic catalyst, while from the standpoint of uniform reaction of raw materials, an acid catalyst is preferable. Therefore, it is preferable to properly use a catalyst according to needs.

After gelling of a sol solution on a porous collector, it is baked at 200 to 600° C., preferably at 200 to 400° C. in air or in an atmosphere such as oxygen flow and the like. By this, an electrode active material membrane layer is formed on a porous collector. Since baking temperature is low, it is excellent in use of a metal of low melting point such as aluminum and the like.

When a metal salt is dispersed in a water-alcohol solution, a metal oxide or metal hydroxide forms fine particles of several nm to several hundreds of nm, to give a sol solution. This is very small as compared with the particle size of 1 to 50 μm of general positive electrode active materials. Therefore, a positive electrode active material membrane layer formed using the sol solution can shorten the diffused distance of electrons on a positive electrode active material, and can improve a discharge property under heavy current.

The sol-gel method is not limited to the above method, and for example, methods described in Japanese Patent Application Laid-open Nos. H9-175825 and H10-247497 and the like may be used.

The method of producing an electrode has been explained referring to a positive electrode. However, such a method of producing an electrode is not limited to this, and can be applied also to a negative electrode.

As the method of producing a negative electrode, a method of applying a negative electrode slurry on a collector and drying this may also be used.

The negative electrode slurry contains a negative electrode active material, and additionally, can contain a conductive material for enhancing electron conductivity, binder, electrolyte salt for enhancing ion conductivity, electrolyte and the like.

The negative electrode slurry is applied on a negative electrode collector by a screen printing method and the like, and usually, dried at 40 to 150° C. for 5 minutes to 20 hours. Thereafter, press roll is preferably conducted.

Production of an electrolyte layer can be conducted by the following methods.

When a solid polymer electrolyte is used, the solid polymer electrolyte is produced by hardening a solution prepared by dissolving an electrolyte polymer, electrolyte salt and the like in a solvent such as N-methyl-2-pyrrolidone (NMP) and the like.

For example, the solution or electrolyte precursor is applied on the electrode, to form an electrolyte layer having predetermined thickness or part thereof (layer having thickness which is about half of the thickness of the electrolyte layer). Thereafter, an electrode on which an electrolyte layer has been laminated is polymerized simultaneously with hardening or heat drying, to enhance the mechanical strength of the electrolyte, and to form an electrolyte layer.

Alternatively, an electrolyte layer or part thereof (layer having thickness which is about half of the thickness of the electrolyte layer) to be laminated between electrodes is separately prepared. The electrolyte layer is produced by applying the solution of electrolyte precursor on a suitable film, and polymerizing this simultaneously with hardening or heat drying. As the film, polyethylene terephthalate (PET), polypropylene film and the like can be used, but the film should not be limited to these.

For hardening or heat drying, a vacuum drier and the like can be used. Heat drying conditions are determined depending on a solution or electrolyte precursor, and cannot be defined to a single method, however, heat drying is usually conducted at 30 to 110° C. for 0.5 to 12 hours.

When a separator impregnated with electrolysis solution is used as an electrolyte layer, it can be produced by various production methods, for example, a vacuum filling method and the like, therefore, detailed descriptions thereof are abbreviated.

A positive electrode and negative electrode produced as described above are placed facing each other via an electrolyte layer, to give battery units.

In the case of a bipolar type battery, it may be preferable to laminate a plurality of the battery units to form a battery laminate so as to obtain a battery having desired output. In lamination, collectors are laminated while adhering at several positions an insulation film such as a polyimide film or the like having suitable thickness sandwiched between them so that collectors do not come into mutual contact to cause short circuit.

On the outermost layer on the positive electrode side, an electrode forming only a positive electrode layer on a collector is placed. On the outermost layer on the negative electrode side, an electrode forming only a negative electrode layer on a collector is placed. A stage of laminating a bipolar electrode and an electrolyte layer (membrane) or laminating an electrode on which an electrolyte layer (membrane) has been formed to obtain a bipolar battery is preferably conducted under an inert atmosphere from the standpoint of prevention of mixing of water and the like into a battery. For example, it is advantageous to produce a bipolar battery under an argon atmosphere or a nitrogen atmosphere.

On electrode layers on both outermost layers of a battery unit or battery laminate, a positive electrode terminal plate and a negative electrode terminal plate are placed respectively, and a positive electrode lead and a negative electrode lead are electrically connected to the positive electrode terminal plate and negative electrode terminal plate, respectively. As the method of connecting a positive electrode lead and a negative electrode lead, ultrasonic wave welding at low connecting temperature and the like can be suitably used, but the method should not be limited to this.

Finally, the whole body of a power generation element is sealed with a battery case to prevent deterioration under environment and impact from outside. In sealing, parts of a positive electrode lead and a negative electrode lead are drawn out of the battery. The material of a battery case is suitably a metal (aluminum, stainless, nickel, copper and the like) coated with an insulation body such as a polypropylene film and the like on the inside surface thereof.

The present invention will be described in detail with reference to examples. The examples described below, however, merely exemplify the present invention and the present invention is not limited thereto.

EXAMPLE 1

Figure 6:
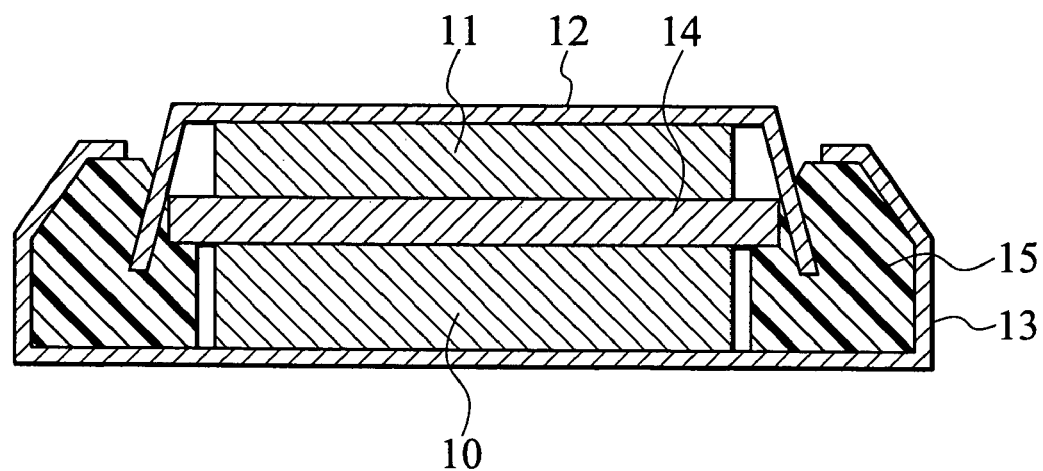
FIG. 6 is a cross-sectional view of a coin battery produced in examples and comparative examples.

A coin battery shown in FIG. 6 was produced by the following procedure.

Figure 7:
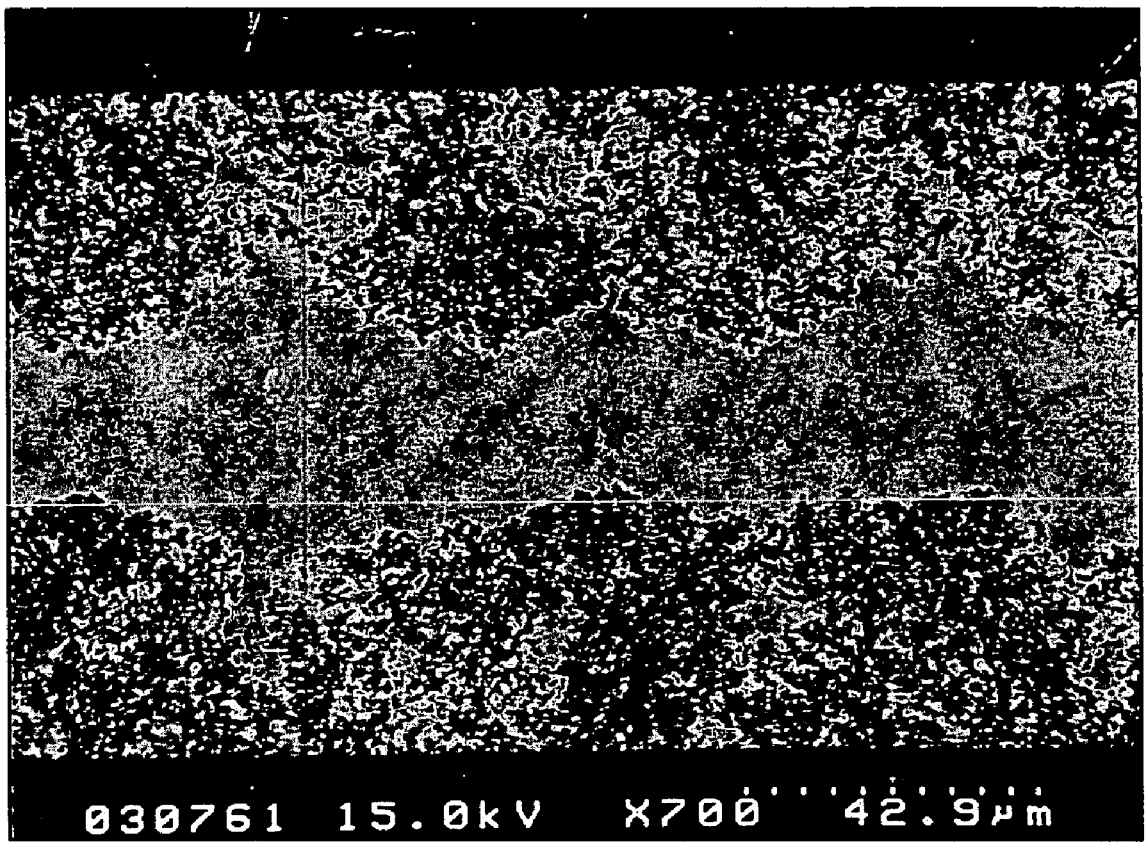
FIG. 7 is a cross-sectional view showing an etching foil obtained in Example 1.

An aluminum foil (purity: 99.9% by weight, thickness: 50 μm, width: 120 mm) was treated at a current density of 50 A/m$^2$ and an alternating current of 50 Hz in electrolytic solution of 40° C. containing 10% by weight of hydrochloric acid, 0.1% by weight of sulfuric acid and 2% by weight of aluminum chloride, to obtain an etching foil. The resulting etching foil was photographed by an electron microscope, and the photograph is shown in FIG. 7.

Separately, cobalt acetate (24.9 g) and lithium nitrate (6.9 g) were mixed, and this was added to 1 liter of a water-ethanol (50:50) solution, and mixed. Further, to this was added polyvinyl alcohol (0.5% by weight) as a stabilizer and mixed.

To the resulting mixed liquid was added the etching foil, then, the foil was lifted, and immersed in a 25% ammonium solution for 1 minute before drying, then, dried under vacuum, to obtain an etching foil containing therein a gel. This etching foil was baked at 400° C. in air for three days, to obtain a positive electrode plate of the present invention.

As the negative electrode 11, a lithium metal in the form of foil was fitted to a battery lid 12.

Next, a positive electrode 10 obtained by punching the positive electrode plate at 15 mmΦ was placed in a stainless sheath can 13, and a separator 14 made of a polypropylene fine porous membrane (thickness: 20 μm) was placed on this. Into this, an electrolyte of 1M LiPF$_5$/EC+PC (1:1 (volume ratio)) was injected, and the battery lid 12 was placed on this, and a sealant 15 composed of a mixture of styrene-butadiene rubber and pitch was filled in without gap to give sealing, producing a coin battery as shown in FIG. 6. This battery has a diameter of 20 mm and a height of 3.2 mm.

COMPARATIVE EXAMPLE 1

On an aluminum foil (purity: 99.9% by weight, thickness: 50 μm, width: 120 mm) was applied a NMP solution containing 85% by weight of lithium cobaltate, 10% by weight of polyvinylidene fluoride and 5% by weight of acetylene black, and this was dried at 120° C. for 10 minutes to obtain a positive electrode plate.

Next, the same procedure as in Example 1 was performed to produce a coin battery.

(Evaluation)

The batteries in Example 1 and Comparative Example 1 were charged and discharged at 0.1 mA, 1 mA, 5 mA, 10 mA, 50 mA and 100 mA, and the capacity thereof was measured. The results are described in the following Table 1.

TABLE 1

| Current (mA) | 0.1 | 1.0 | 2.0 | 5.0 | 10 | 20 | 50 | 100 |
| --- | --- | --- | --- | --- | --- | --- | --- | --- |
| Example (mAh) | 2.3474 | 2.1128 | 2.0474 | 1.9372 | 1.8191 | 1.5349 | 0.6574 | 0.2094 |
| Comparative Example (mAh) | 2.3488 | 2.1043 | 2.0266 | 1.6868 | 1.1619 | 0.5787 | 0.1835 | 0.0441 |

As shown in the Table 1, when current is 100 mA, the battery capacity was about 5-fold in the example using an electrode of the present invention as compared with the comparative example using an electrode produced by a conventional coating method. Namely, it is found that the battery of the present invention can manifest an excellent performance even in charging and discharging at high speed.

Further, the battery of the present invention can manifest an excellent performance without using a binder and conductive material.

The entire content of a Japanese Patent Application No. P2003-309744 with a filing date of Sep. 2, 2003 is herein incorporated by reference.

Although the invention has been described above by reference to certain embodiments of the invention, the invention is not limited to the embodiments described above will occur to these skilled in the art, in light of the teachings. The scope of the invention is defined with reference to the following claims.

What is claimed is:

1. A non-aqueous electrolyte secondary battery, comprising:
    an electrolyte layer comprising:
        lithium ions;
        an electrolyte salt; and
        a polymer; and
    a positive electrode provided on the electrolyte layer, the positive electrode comprising:
        a collector formed of a metal having a thickness from 5 to 200 µm, the collector having a lot of fine pores on a collector surface, the fine pores having a pore size of 0.1 to 10 µm; and
        a membrane layer made of an electrode active material, the membrane layer storing and releasing the lithium ions, having a thickness of 0.1 to 1.0 µm, and being provided along and in contact with the fine pores on the collector surface.

2. A non-aqueous electrolyte secondary battery according to claim 1,
    wherein the collector is made of at least one selected from single bodies or alloys of aluminum, tantalum, niobium, titanium, hafnium, zirconium, zinc, tungsten, bismuth and antimony, and stainless alloy.

3. A non-aqueous electrolyte secondary battery according to claim 1,
    wherein the electrode active material is made of a composite oxide or salt containing lithium and at least one element selected from the group consisting of cobalt, nickel, manganese, titanium, vanadium and iron.

4. A non-aqueous electrolyte secondary battery according to claim 1,
    wherein the non-aqueous electrolyte secondary battery is a bipolar battery.

5. A battery module comprising:
    a plurality of non-aqueous electrolyte secondary batteries, each of the non-aqueous electrolyte secondary batteries being a battery according to claim 1.

6. A vehicle, comprising:
    a non-aqueous electrolyte secondary battery according to claim 1.

7. A non-aqueous electrolyte secondary battery according to claim 1,
    wherein the fine pores of the collector is formed by etching a collector material in an electrolytic solution.

8. A non-aqueous electrolyte secondary battery according to claim 1,
    wherein the membrane layer is formed by a sol-gel method.

* * * * *